United States Patent Office 2,936,788
Patented May 17, 1960

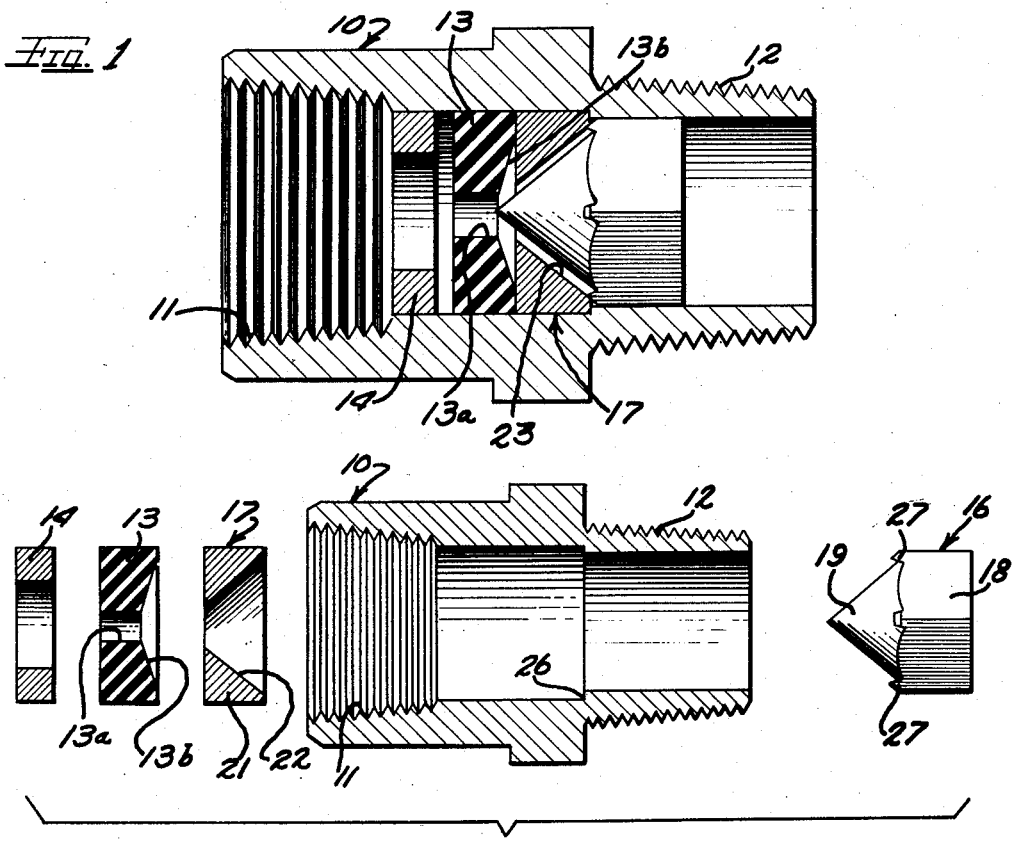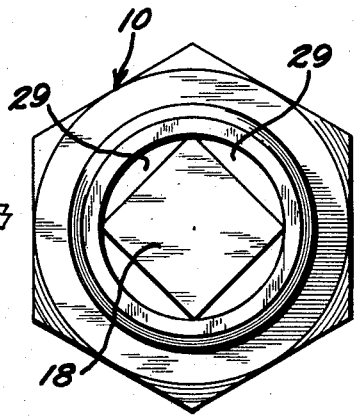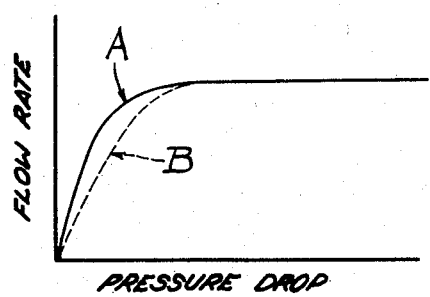

2,936,788

FLOW CONTROL SYSTEM

Robert R. Dahl and Howard L. Erickson, Chicago, Ill., assignors to The Dole Valve Company, Chicago, Ill., a corporation of Illinois Application April 26, 1955, Serial No. 503,874

5 Claims. (Cl. 138—45)

The present invention is directed to improved flow control systems and has particular applicability to those systems which inherently produce objectionable noise during their operation.

Many fluid flow systems in which a liquid is forced as a high velocity stream or jet through a reduced diameter orifice may present the problem of noise generation. While the mechanics of the noise generation are not completely understood, it is reasonable to suppose that the noise is due, at least in part, to the excessive turbulence created in the stream as it issues from the discharge end of the orifice. The nature of the sound produced under these conditions may vary quite widely. The sound, for example, may vary from an unobjectionable hum of low intensity to a shrill, highly objectionable whistle, depending upon factors such as the velocity of the jet stream, the pressure reduction, and similar factors. It will be readily appreciated that such noise presents a distinct drawback to the use of such systems, particularly where the systems are intended to be used in the home.

The problem of noise generation grequently occurs in flow control systems employing annular, resilient flow control washers which are designed to maintain a substantially constant rate of fluid flow over a wide range of pressure variations. It is with this type of flow control system that the succeeding portion of this description specifically pertains, but it will be recognized that the principles involved herein are equally applicable to other flow control systems in which noise generation presents a distinct problem.

An object of the present invention is to provide an improved flow control system including means arranged to reduce substantially, or to eliminate entirely the objectionable part of the noise inherently produced by systems of this type.

Still another object of the invention is to provide an improved form of flow spreading device capable of dissipating the kinetic energy of a high velocity stream and, in doing so, of eliminating the tendency of such streams to generate objectionable noise.

A further object of the invention is to provide an improved flow control system including a resilient, annular flow control member having a relatively small flow control orifice therein, and also including a flow spreading device which cooperates with the flow control member to reduce the noise level without providing a substantial impediment to the flow of the stream.

A still further object of the present invention is to provide an improved method for reducing the noise produced by a high velocity jet stream as it issues from an orifice.

These and other objects of the invention are obtained by providing a flow spreader in the flow control system which is positioned downstream of the orifice and in close proximity thereto, the flow spreader being arranged to divert the flow of liquid from the jet stream issuing from the orifice into at least one confined passage disposed at an angle to the direction of movement of the jet stream. The flow spreader is positioned sufficiently close to the orifice to reduce the noise level substantially without however appreciably increasing the pressure drop across the flow control system.

In a preferred embodiment of the invention, the flow spreader consists of a generally conically shaped element which has its apex positioned in close proximity to the discharge end of the orifice, combined with a member having a recess shaped complementarily to the shape of the flow spreading element, there being a restricted passageway provided between the two elements into which the jet stream flow is diverted. With a system of this type, it has been found that the kinetic energy which the stream accumulates in passing through the restricted orifice is to a large extent dissipated rather gradually by passing through the restricted passageway with the ultimate result that the noise level inherent in such systems is greatly reduced.

A further description of the present invention will be made in conjunction with the attached sheet of drawings which illustrates a preferred embodiment thereof.

In the drawings:

Figure 1 is a view partly in cross-section, with parts in elevation, illustrating the flow control device of the invention in assembled relation;

Figure 2 is an exploded view of the elements shown assembled in Figure 1;

Figure 3 is an end elevational view of the flow control assembly; and

Figure 4 is a graph indicating generally the shape of the discharge curve of the flow control unit of the invention, with the pressure drop being plotted as the abscissae and the flow rate plotted as the ordinates.

As shown in the drawings:

In Figure 1, reference numeral 10 indicates generally a hollow housing of the type adapted to be received, for example, between a supply pipe and the inlet end of a shower spray head. The housing 10 is internally threaded as indicated at 11 for threaded engagement with the pipe, and is outwardly threaded as indicated at numeral 12 to provide for threaded engagement with the shower head.

Disposed within the hollow interior of the housing 10 is a resilient, annular flow control washer 13 composed of rubber, chlorinated rubber, or similar elastic material. The flow control washer 13 is effective to maintain a substantially constant flow over a wide range of pressure variations by its automatic reduction in cross-sectional area of its orifice 13a upon increases in pressure thereon. The general principles upon which such flow control members operate have been described in Kempton Patent No. 2,454,929 which issued on November 30, 1948.

The particular flow control washer 13 employed in the unit of Figure 1 embodies the improvements described and claimed in Robert R. Dahl copending application Serial No. 389,210 entitled "Flow Control Structure" filed October 30, 1953. The washer 13 is of the contoured type, and is relatively loosely received within the hollow interior of the housing 10. The downstream side of the flow control washer 13 is contoured inwardly from the margin thereof, leaving a generally frusto-conical face 13b. Spaced from the upstream side of the flow control washer 13 is a retaining ring 14 which may be a snap ring or the like, thereby accommodating freedom of movement of the flow control washer 13 to at least a small extent within the housing 10.

As the water, or other liquid, passes from the relatively large area provided at the threaded inlet 11 through the severe restriction provided by the orifice 13a, a large portion of the static head originally possessesd by the stream is transformed into kinetic energy, so that a high velocity jet stream issues from the discharge end of the flow control washer 13. If this stream were permitted to expand into the inlet end of the housing 10, it would very likely create an objectionable, high pitched noise or whistle. To overcome this tendency, the flow control assembly of the present invention is provided with a flow spreader means which, in its preferred form, includes a flow spreader element 16 and a flow channelling means 17. In the particular form of the invention illustrated in the drawings, the flow spreader element 16 is composed of a generally square body portion 18 and a conical nose 19 which is received at the discharge end of the orifice 13a.

The flow channelling means 17 may consist of a cylindrical body 21 having a frusto-conical recess 22 which receives the conical nose 19, leaving a flow passageway 23 of gradually increasing diameter therebetween.

The flow channelling means 17 provides a seat for one end of the flow control washer 13, and is received at its other end against an internal shoulder 26 provided in the housing 10 (see Figure 2). The flow spreader element 16 is tightly received within the bore of the threaded outlet 12 and has a plurality of spaced lugs 27 which serve as positioning means when they abut the downstream end of the flow channelling means 17, as best illustrated in Figure 1 of the drawings.

Some benefits are achieved in noise reduction even if the flow channelling means 17 is eliminated from the housing. However, vastly improved results are obtained if the flow channelling means is included.

The liquid leaving the orifice 13a strikes the apex of the conical nose 19 on the flow spreader element 16 and is then confined in the flow passageway 23. In doing so, the direction of the jet stream is changed and a substantial amount of its kinetic energy is dissipated. Our work has indicated that the best results are obtained if the annular area of flow provided by the passageway 23 is more or less constant, or preferably increases gradually toward the discharge end of the flow control device. In other words, there should be no abrupt change in cross-sectional area from the time the jet stream leaves the discharge orifice 13a until it is expelled from the flow control unit through the passages 29 existing between the square body portion 18 and the inner cylindrical wall of the discharge end of the housing 10. In order to provide this characteristic, it is advisable to have the passageway 23 vary in thickness slightly along its length. This can be done most conveniently by modifying the angle of the conical face 19 in comparison with the angle of the tapered recess 22. For example, in one form of the invention, we used a recess 22 in which the sides included an angle of 90° whereas the included angle at the conical nose 19 was about 94°. This meant that the spacing between the recess 22 and the conical nose portion 19 actually decreased toward the discharge end of the flow control unit, but this was more than compensated for by the fact that the diameter of the flow passageway 23 progressively increases toward the discharge end, so that the actual flow area is somewhat increased.

The proper positioning of the flow spreader element 16 with respect to the orifice 13a is of primary importance in the present invention. Generally speaking, the optimum position for the flow spreader element is sufficiently close to the orifice to reduce the noise level substantially, but insufficiently close to offer a substantial impediment to the flow of the liquid stream, thereby creating an additional pressure drop. The exact location of the flow spreader means will, of course, depend upon the specific parameters involved in any particular installation. It is, however, a relatively simple matter to determine the optimum position for each set of conditions. This is done most conveniently by the use of a graph of the type shown in Figure 4 of the drawings in which the flow rate through the flow control system is plotted against the pressure drop across the system. The solid line graph indicated as letter A represents the flow characteristics of the flow control system with no flow spreader element being included, or with the flow spreader element being positioned properly so that it does not account for an additional pressure drop. The dashed line curve, labeled "B" represents the curve obtained when the flow spreader element is inserted too far into the orifice 13a so that it creates a pressure drop in the system. The optimum positioning of the flow spreader element 16 is therefore at that point just below that at which it would create a measurable or an appreciable pressure drop across the flow control system. Our experience has indicated that while this represents the optimum condition, some variation from this optimum is permissible. Our work has indicated, for example, that the clearance between the conical nose 19 of the flow spreader element and the flow channelling means 17, i.e., the flow area in passageway 23 may be increased up to 40% over the clearance present in the optimum position and still result in effective noise reduction. However, at values outside this range it will be generally found that either the flow spreader element provides a serious impediment to the flow, or the noise level is not sufficiently reduced.

It is also important that the passageway 23 be sufficiently long to achieve the desired objectives. As a general rule, the flow of the liquid must be diverted and confined in the passageway 23 for a flow length of several times the minimum dimension of the passageway 23.

Noise level tests taken with a flow control unit of the type illustrated in the drawings illustrate quite definitely the improvements achieved by the inclusion of the flow spreader means, and particularly, the combination of the flow spreader and the restriction provided by the flow channelling means 17. The following table illustrates the observed noise level at various pressure drops across the system, the readings being taken both with the flow channelling means 17 in place and without the flow channelling means being present.

*Table I*

[Noise level, db.]

| Pressure drop, p.s.i. | Without flow spreader | With flow spreader, but without restriction | With flow spreader, including restriction |
| --- | --- | --- | --- |
| 20 | 59 | 58 | 55 |
| 40 | 67 | 63 | 59 |
| 60 | 71 | 66 | 60 |
| 80 | 76 | 69 | 61 |
| 100 | 76 | 71 | 61 |
| 120 | 76 | 71 | 61 |
| 140 | 76 | 71 | 60 |

As observed from the foregoing table, the reduction in noise level is most pronounced at high pressure drops. Even at low pressure drops, however, the performance of the flow control system is improved substantially because the character of the noise is modified considerably. It was observed for example that even where the absolute level of the noise was not decreased below the threshold of audibility, the shrillness of the noise produced was substantially reduced by the flow spreader arrangement.

It will be appreciated that a substantial amount of the noise represented in the noise level values of the foregoing table is attributed to the unavoidable and unobjectionable noise of the water rushing through the flow control system. The noise reduction is attributable, therefore, to a large extent to the elimination of the very objectionable high pitched tones which occur in the absence of the flow spreading means.

As evident from the table, at the higher pressure drops, the reduction in noise level obtained when employing both the flow spreader and the restriction averages about 15 db. Translated into terms of power, this means that the noise level was reduced by a factor of about 31 times.

From the foregoing, it will be appreciated that the flow control system of the present invention provides an effective means for reducing substantially, or eliminating the objectionable noise frequently encountered in systems where a high velocity jet is produced. It will also be evident that various modifications can be made to the described embodiment without departing from the scope of the present invention.

We claim as our invention:

1. A flow control system comprising a housing, a resilient annular flow control member in said housing providing an orifice therein, a flow spreader positioned downstream from and in close proximity to the discharge end of said orifice, and means in said housing cooperating with said flow spreader to provide a confined annular diverging frusto-conical flow path for the liquid issuing from said orifice, but providing no abrupt area changes for said stream, whereby a portion of the kinetic energy of the stream leaving said orifice is gradually dissipated along said flow spreader.

2. A flow control system comprising a housing, a resilient annular flow control member in said housing providing a flow control orifice therein, a flow spreader having a nose positioned downstream from and in close proximity to the discharge end of said orifice and diverging therefrom, and means in said housing having a wall parallel to said nose and spaced radially outwardly therefrom providing a recess complementary in shape to the shape of said flow spreader, and providing with said flow spreader a confined flow path for the liquid discharging from said orifice, said flow spreader being positioned sufficiently close to said means to reduce the noise level inherent in the operation of said system, but not close enough to said means to cause an appreciable pressure drop due to its location.

3. A flow control system comprising a housing, a resilient annular flow control member in said housing, a conically shaped flow spreader having its apex positioned in close proximity to the discharge end of said orifice, and means in said housing having a conically shaped recess accommodating said flow spreader and providing with said flow spreader a confined flow path for the liquid discharging from said orifice.

4. A flow control system comprising a housing, a resilient annular flow control member in said housing, a conically shaped flow spreader having its apex positioned in close proximity to the discharge end of said orifice, and means in said housing having a conically shaped recess accommodating said flow spreader and providing with said flow spreader a confined flow path for the liquid discharging from said orifice, said flow spreader being positioned sufficiently close to said means to reduce the noise level inherent in the operation of said system, but not close enough to said means to cause an appreciable pressure drop due to its location.

5. A flow control device for liquids comprising a conduit having an inner wall of a relatively large diameter adapted to be connected to a source of liquid under pressure, a resilient annular flow control member in said conduit for effecting a substantially uniform rate of flow therethrough under varying liquid pressures at said source, said flow control member having a central orifice of smaller diameter than the inside diameter of said conduit, flow spreader means in said conduit adjacent said flow control member on the downstream side thereof for diverting liquid flowing through the orifice of said flow control member outwardly toward the inside wall of said conduit, and means in said housing forming a support for said resilient annular flow control member against upstream pressure thereon and having a downstream recess of complementary shape to the shape of said flow spreader means and providing with said flow spreader means a confined liquid flow path for liquid discharging from said orifice.

References Cited in the file of this patent

UNITED STATES PATENTS

| 624,062 | Mattews | May 2, 1899 |
| 1,084,883 | Holzwarth | Jan. 20, 1914 |
| 1,271,758 | Petito | July 9, 1918 |
| 1,709,217 | Hamilton | Apr. 16, 1929 |
| 1,777,522 | Hamilton | Oct. 7, 1930 |
| 1,993,895 | Ploen | Mar. 12, 1935 |
| 2,454,929 | Kempton | Nov. 30, 1948 |
| 2,485,555 | Bester | Oct. 25, 1949 |